United States Patent
Kandasamy

(10) Patent No.: US 11,001,386 B2
(45) Date of Patent: May 11, 2021

(54) UNMANNED AERIAL VEHICLE INTEGRATED WITH AUTOMATIC RENEWABLE ENERGY CHARGING SYSTEM

(71) Applicant: Dushan Kandasamy, London (GB)

(72) Inventor: Dushan Kandasamy, London (GB)

( * ) Notice: Subject to any disclaimer, the term of this patent is extended or adjusted under 35 U.S.C. 154(b) by 0 days.

(21) Appl. No.: 17/044,801

(22) PCT Filed: May 3, 2019

(86) PCT No.: PCT/IB2019/053649
§ 371 (c)(1),
(2) Date: Oct. 1, 2020

(87) PCT Pub. No.: WO2019/211812
PCT Pub. Date: Nov. 7, 2019

(65) Prior Publication Data
US 2021/0046837 A1    Feb. 18, 2021

(30) Foreign Application Priority Data
May 3, 2018    (GB) ...................................... 1807279

(51) Int. Cl.
| | | |
|---|---|---|
| *B64D 27/24* | (2006.01) | |
| *G05D 1/04* | (2006.01) | |
| *B60L 53/51* | (2019.01) | |
| *B64C 39/02* | (2006.01) | |

(Continued)

(52) U.S. Cl.
CPC .............. *B64D 27/24* (2013.01); *B60L 53/51* (2019.02); *B60L 58/12* (2019.02); *B64C 39/024* (2013.01);

(Continued)

(58) Field of Classification Search
CPC .......... B64D 2211/00; B64C 2201/042; B64C 2201/066; H02S 10/40
See application file for complete search history.

(56) References Cited

U.S. PATENT DOCUMENTS 6,371,409 B1 * 4/2002 Steele ....................... B64B 1/00
136/292
7,464,895 B2 * 12/2008 Palmer ...................... B64B 1/14
244/30

(Continued)

FOREIGN PATENT DOCUMENTS

| CN | 107215464 A | 9/2017 |
|---|---|---|
| EP | 3150491 A1 | 4/2017 |
| WO | 2010027801 A2 | 3/2010 |

OTHER PUBLICATIONS

"Design Analysis of Solar-Powered Unmanned Aerial Vehicle", https://www.scielo.br/scielo.php?script=sci_arttext&pid=S2175-91462016000400397.

(Continued)

*Primary Examiner* — Brian M O'Hara

(57) ABSTRACT

An unmanned aerial vehicle such as drone integrated with solar power unit, is disclosed. The solar power unit of the drone comprises a solar panel assembly positioned at a hull of the drone. The solar panel assembly is composed of a curtain-type shutter embedded with a plurality of photovoltaic cells. The shutter is formed of a plurality of slats having space between each of the slats, wherein the space facilitates for an effective dislocation of wind diffusion to maintain the stability of the hovering drone. The shutter further comprises a means for twisting and turning the shutter to provide balance for the hovering drone Further, the solar power unit comprises an energy storage unit operably coupled to the solar panel assembly for storage of the electrical energy from the solar panel. Further, the shutter is configured to spin cyclically diffusing the gust of wind harmlessly for stabilizing the hovering drone.

12 Claims, 21 Drawing Sheets

(51) Int. Cl.
*B60L 58/12* (2019.01)
*H02S 30/20* (2014.01)
*H02S 40/38* (2014.01)
*H02S 10/40* (2014.01)

(52) U.S. Cl.
CPC .............. *G05D 1/042* (2013.01); *H02S 10/40* (2014.12); *H02S 30/20* (2014.12); *H02S 40/38* (2014.12); *B64C 2201/042* (2013.01); *B64C 2201/066* (2013.01); *B64C 2201/141* (2013.01); *B64D 2211/00* (2013.01)

(56) References Cited

U.S. PATENT DOCUMENTS

| | | | |
|---|---|---|---|
| 8,006,933 B2* | 8/2011 | Tillotson | B64B 1/06 244/127 |
| 9,272,783 B2 | 3/2016 | Pearson | |
| 10,399,400 B2* | 9/2019 | Hartshorn | B63G 8/001 |
| 2010/0000592 A1* | 1/2010 | Ko | F24S 30/20 136/246 |
| 2018/0075760 A1 | 3/2018 | Thompson et al. | |
| 2020/0346736 A1* | 11/2020 | Krasnoff | B64C 27/52 |

OTHER PUBLICATIONS

"Active power management system for an unmanned aerial vehicle powered by solar cells, a fuel cell, and batteries", https://ieeexplore.ieee.org/document/6978906.

"Autonomous Wireless Self-Charging for Multi-Rotor Unmanned Aerial Vehicles", https://www.mdpi.com/1996-1073/10/6/803.

"Wireless battery charging system for drones via capacitive power transfer", https://ieeexplore.ieee.org/abstract/document/7959357.

\* cited by examiner

UNMANNED AERIAL VEHICLE INTEGRATED WITH AUTOMATIC RENEWABLE ENERGY CHARGING SYSTEM

CROSS REFERENCE TO RELATED APPLICATIONS

The present application claims the benefit of PCT patent application PCT/IB2019/053649 for "Unmanned Aerial Vehicle Integrated with Automatic Renewable Energy Charging System", filed May 3, 2019 which further claims the priority of gr GB Patent Application GB1807279.3 for "Unmanned Ariel Vehicle Integrated with Solar Power Unit", filed May 3, 2018, the contents of which is hereby incorporated by reference.

BACKGROUND OF THE INVENTION

A. Technical Field

The present invention generally relates to the field of unmanned aerial vehicles (UAV), such as drone, and more particularly to an unmanned aerial vehicle integrated with automatic renewable energy charging system, such as a solar power unit.

B. Description of Related Art

Drones are an aerial vehicle without a human pilot aboard to control the vehicle. These aerial vehicles are controlled either by onboard computers or a via remote control by a human operator. Drones are becoming popular in industries like law enforcement, agriculture, or markets because of its ability to survey the environment aerially by carrying sensors or cameras. Generally, drones include components such as a propulsion system, a power source, a controller and a remote communication system. Further, drones designed for performing specific functions such as aerial survey, sensing functions include fewer more electronic components such as camera, sensors etc. However, for the drone need to be operative and perform all the preconfigured functions, it requires a continuous power supply. The continual operation and addition of various electronic equipments into the drone to achieve desired functionalities could exhaust the onboard power source quickly.

Conventionally, power sources such as fuel, a rechargeable battery or a power backup are employed to meet the power requirements of the drone. However, utilizing the rechargeable power backup requires periodic landing of the drone to replenish its power source. Hence, a common requirement of drones is a need for a non-exhaustive power source.

Therefore, there is a need for a drone with an integrated power source which replenishes the required power automatically.

SUMMARY OF THE INVENTION

The present invention relates to an unmanned aerial vehicle such as a drone integrated with automatic renewable energy charging system, such as a solar power unit.

According to the present invention, the solar power unit of the drone comprises a solar panel assembly positioned at a hull of the drone. The solar panel assembly is composed of a curtain-type shutter embedded with a plurality of photovoltaic cells. In one embodiment, the shutter is formed of a plurality of slats having space between each of the slats. In one embodiment, the spaces in between each of the slats facilitate for an effective dislocation of wind diffusion to maintain the stability of the hovering drone. In an embodiment, the construction of the curtain-type shutter allows the curtain to drop down. In one embodiment, the drop-down function allows the shutter to extend about 10 meters and facilitates conservation of maximum energy. Further, the drone comprises an extensive extending protrusion capability that facilitates absorption of solar energy, and acts as a methodology to distribute the absorbed energy to other drone devices. In an embodiment, the curtain-type shutter is hemispheric shape to facilitate maximum absorption of solar energy. In another embodiment, the curtain-type shutter is made from a synthetic fiber such as Kevlar®.

In one embodiment, the curtain-type shutter includes means for twisting and turning the slats of the shutter. In one embodiment, the twisting and turning means of the shutter provides a stationary balance for the hovering drone. In an embodiment, the drone employs methods to facilitate maximum absorption of gust of wind, to harmlessly move the shutter inward and outward direction. In one embodiment, the curtain-type shutter or blind is configured to spin cyclically diffusing the gust of wind harmlessly for stabilizing the hovering drone. In one embodiment, the curtain-type shutter is configured to sail downward and enables to absorb solar energy. In one embodiment, the curtain-type shutter is configured to provide the west wind and east wind trajectory of the drone respective of the blowing wind. Further, the solar power unit further comprises an energy storage unit operably coupled to the solar panel assembly for storage of the electrical energy from the solar panel.

In another embodiment, the unmanned aerial vehicle comprises an enclosure, a protective cover assembly, and a controller. In another embodiment, the solar panel assembly is a sail embedded with a plurality of photovoltaic cells, hereinafter referred as PV sail. In one embodiment, the solar panel assembly is disposed within the enclosure of the unmanned aerial vehicle. The enclosure comprises an opening. The protective cover assembly is disposed at the opening of the enclosure. In one embodiment, the solar panel assembly is a curtain-type shutter embedded with a plurality of photovoltaic cell. The energy storage unit in communication with the photovoltaic sail is configured to store energy generated from the solar panel. The controller in communication with the solar panel assembly, enclosure, energy storage unit and protective cover assembly configured to monitor the voltage level of the energy storage unit. In one embodiment, if the voltage level of the energy storage unit is equal to or smaller than a predetermined voltage, the controller is configured to open the protective cover assembly and disengages the solar panel to collect solar energy to charge the power storage unit. In one embodiment, if the voltage level of the energy storage unit is above the predetermined voltage, the controller is configured to retract the disengaged solar panel into the enclosure and closes the opening via the protective cover assembly.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF THE DRAWINGS

A more complete understanding of the present invention, and the advantages and features thereof, will be more readily understood by reference to the following detailed description when considered in conjunction with the accompanying drawings wherein.

DETAILED DESCRIPTION OF EMBODIMENTS

A description of embodiments of the present invention will now be given. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

Figure 1:
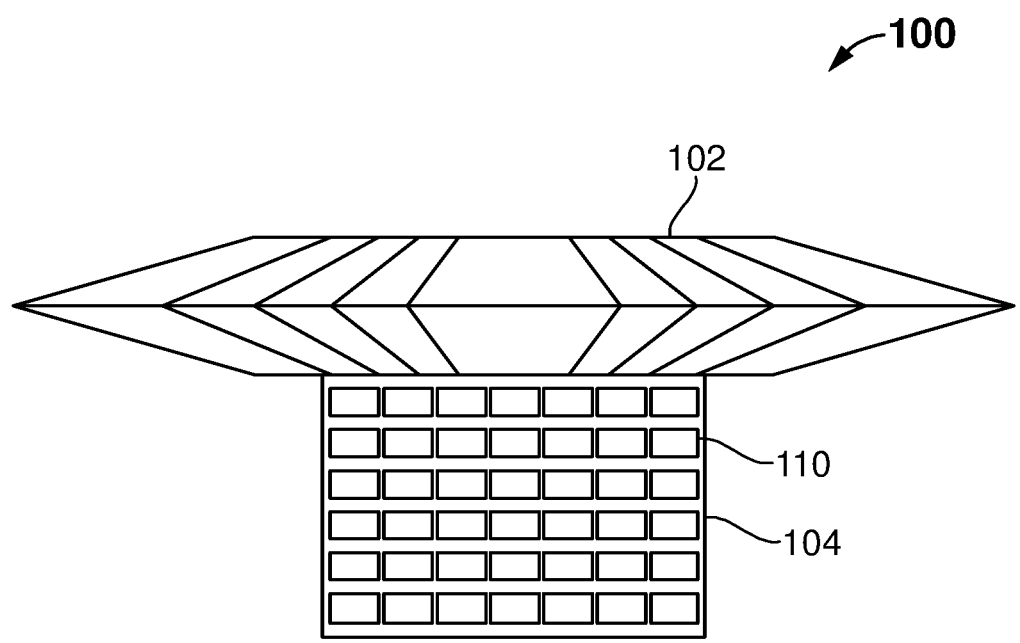
FIG. 1 shows a front view of an unmanned aerial vehicle such as drone integrated with solar panel assembly in an embodiment of the present invention.

Referring to FIG. 1, the present invention relates to an unmanned aerial vehicle such as a drone 102 integrated with automatic renewable energy charging system 100, the renewable energy charging system is a solar power unit. The solar power unit of the drone 102 comprises a solar panel assembly positioned at a hull of the drone 102. In one embodiment, the solar power unit is composed of sail embedded with a plurality of photovoltaic solar collectors or photovoltaic cells 110 plurality of photovoltaic solar collectors or photovoltaic cells 110, referred as PV sail 104.

Figure 2:
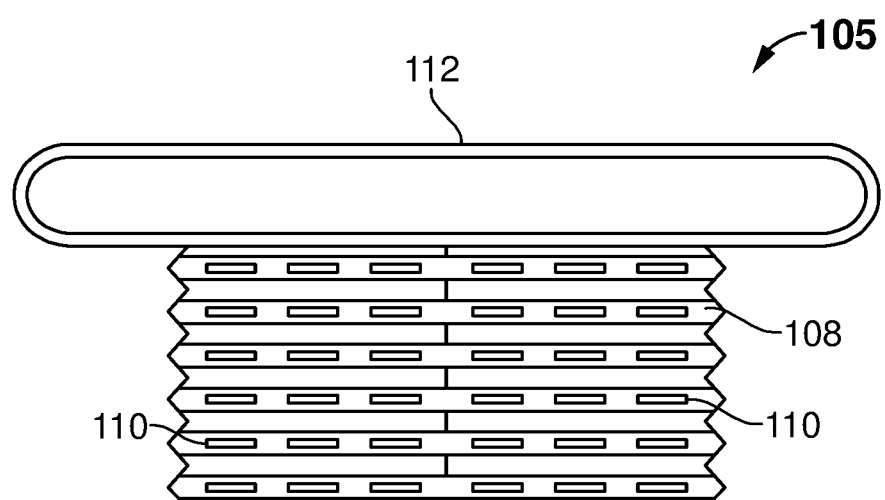
FIG. 2 shows a front view of the solar panel assembly of the drone in an embodiment of the invention.

Referring to FIG. 2, the solar panel assembly is composed of a curtain-type shutter 105 embedded with a plurality of photovoltaic solar collectors or photovoltaic cells 110. In an embodiment, the shutter 105 is formed of a plurality of slats 108 having a space between each of the slats 108. In one embodiment, the space in between each of the slats 108 facilitates for an effective dislocation of wind diffusion to maintain the stability of the hovering drone 102. In one embodiment, the shutter 105 is of 2-inch thickness. In one embodiment, the construction of the curtain-type shutter 105 allows the curtain to drop down when needed, for example during daytime and allows to be rolled up or moved to an out-of-the-way position when not in use, for example during night time. Further, the shutter 105 comprises a roller unit 112 which facilitates to wind up the curtain-type shutter 105 and holds in place when the shutter 105 is not in use.

In one embodiment, the drop-down function allows the shutter 105 to extend about 10 meters and facilitates conservation of maximum energy. In one embodiment, the drone 102 is configured to maneuver itself to facilitate maximum absorption of solar energy through the curtain-type shutter 105 embedded with photovoltaic cells 110. Further, the drone 102 comprises an extensive extending protrusion capability that facilitates absorption of solar energy and acts as a methodology to distribute the absorbed energy to other drone devices. In one embodiment, the curtain-type shutter 105 is made from a synthetic fiber such as Kevlar®. In one embodiment, the curtain-type shutter 105 is hemispheric shape to facilitate maximum absorption of solar energy. In one embodiment, the extension capability of shutter 105 allows reducing the charging time indefinitely as the energy conservation is maximum. Thus, utilizing the shutter 105 embedded with photovoltaic cells 110 provides an economical power source with high reliability and high efficiency. Further, this solar energy absorption capability provides an integrated solar charging station for the drone 102.

In an embodiment, the curtain-type shutter 105 comprises one or more protrusions to facilitate the movement of air flow and provide stability to the drone 102. In one embodiment, the curtain-type shutter 105 includes a twisting and turning means 106 for the slats 108 of the shutter 105. In one embodiment, the twisting and turning means 106 of the shutter 105 provides a stationary balance for the hovering drone 102. In one embodiment, the drone 102 employs methods to facilitate maximum absorption of gust of wind and to harmlessly move the shutter 105 inward and outward direction. In one embodiment, the curtain-type shutter/blind 105 is configured to spin cyclically diffusing the gust of wind harmlessly for stabilizing the hovering drone 102.

In one embodiment, the curtain-type shutter 105 is configured to sail downward and enables to absorb solar energy. In one embodiment, the design of the curtain-type shutter 105 is configured to provide the west wind and east wind trajectory of the drone 102 respective to the blowing wind. The present invention operates like a hinge within a door or an elastic substance etc. Further, the present invention facilitates predetermined amount of compression imparted due to a gust of wind pushing the flat shutter 105 off.

Figure 3:
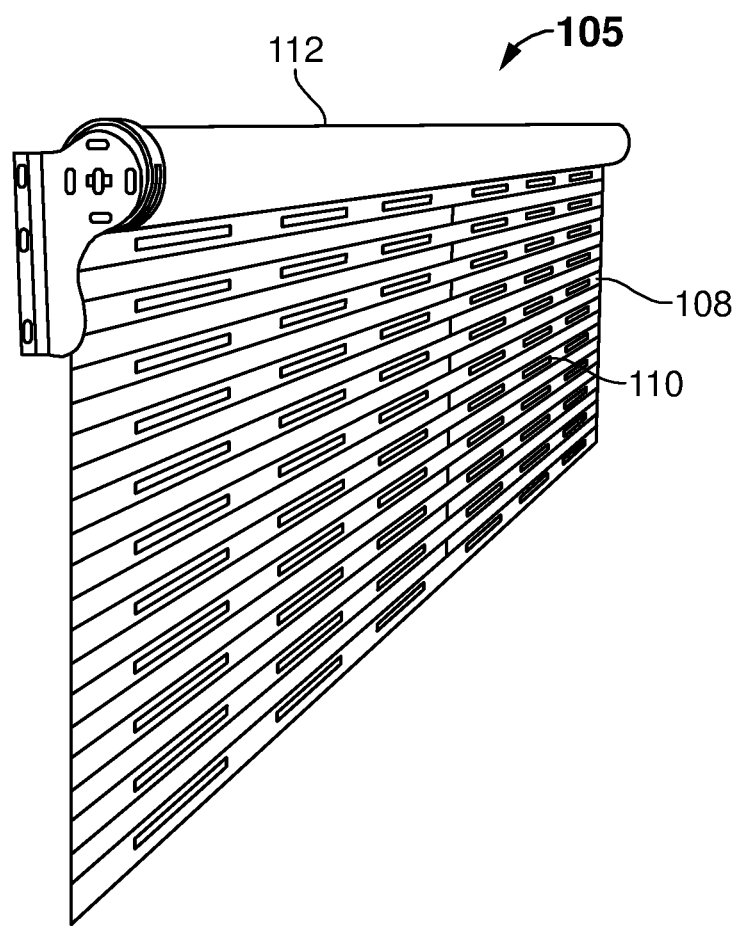
FIG. 3 shows a perspective view of the solar panel assembly of the drone in an embodiment of the invention.
Figure 4:
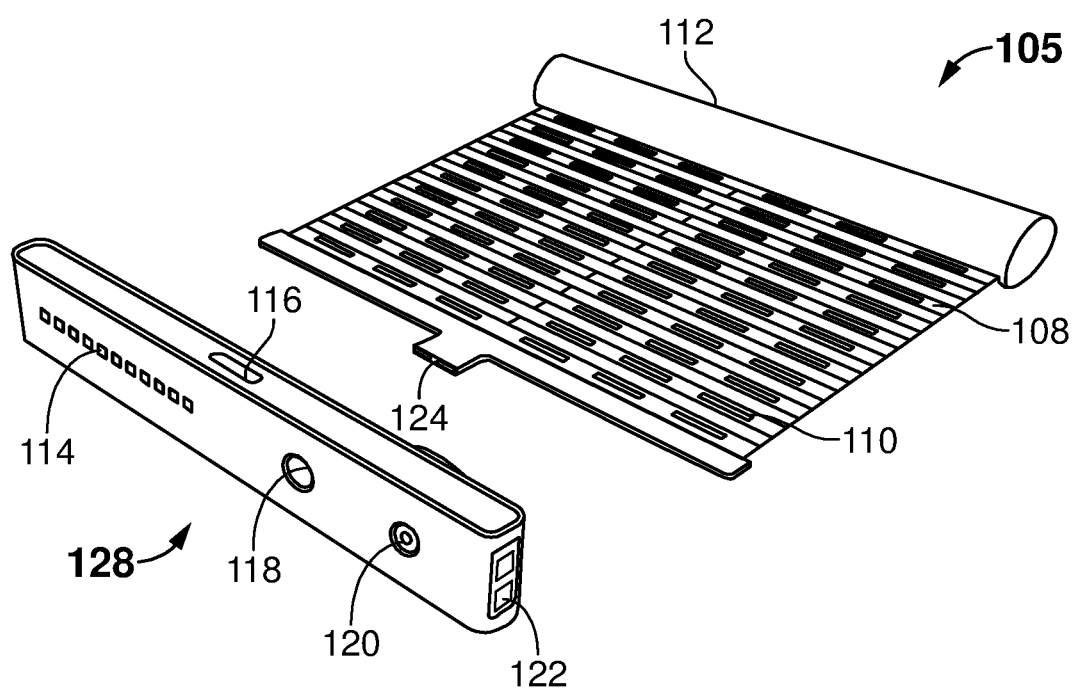
FIG. 4 shows a perspective view of the solar panel assembly and the energy storage unit in an embodiment of the present invention.

Referring to FIG. 3, a perspective view of the shutter 105 is shown. The shutter 105 comprises a roller unit 112, which facilitates to wind up the curtain-type shutter 105 when the shutter 105 is not in use. Referring to FIG. 4, the solar power unit of the present invention further comprises an energy storage unit 128 in an embodiment of the present invention. The energy storage unit 128 comprises a battery unit and suitable electronic components for storing the energy and charging the battery. The energy storage unit 128 further comprises a battery indicator 114 configured to display the level of charge in the battery. In one embodiment, the energy storage unit 128 further comprises a power switch 120 to control the supply of power from the battery unit.

In one embodiment, the energy storage unit 128 further comprises a means for delivering the electrical power to the drone 102 such as a USB port 122. In one embodiment, the energy storage unit 128 further comprises a connection slot 116 for receiving an electrode 124 of the shutter 105 for transfer of electrical energy from the solar panel assembly to the energy storage unit 128. In one embodiment, the shutter 105 could be released via a release switch 118 to wound up and held in place using the roller unit 112 when the shutter 105 embedded with photovoltaic cells 110 is not in use, for example at nighttime.

Figure 5:
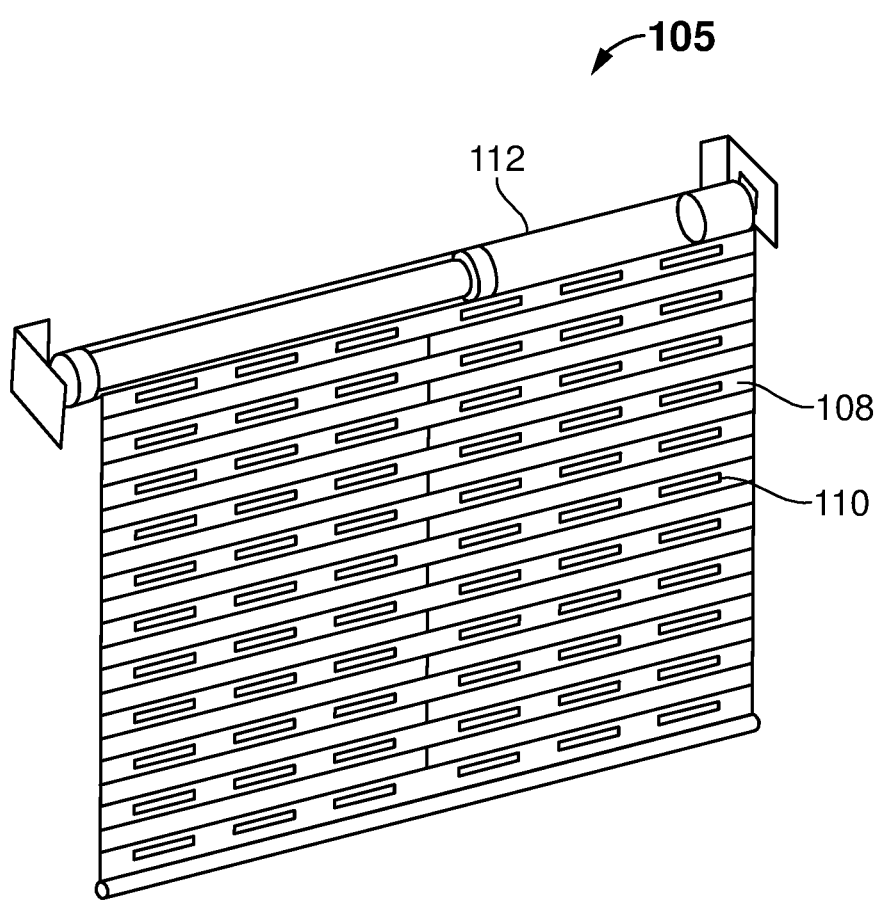
FIG. 5 illustrates a perspective view of curtain-type shutter embedded with photovoltaic cells via a remote control in an embodiment of the present invention.
Figure 6:
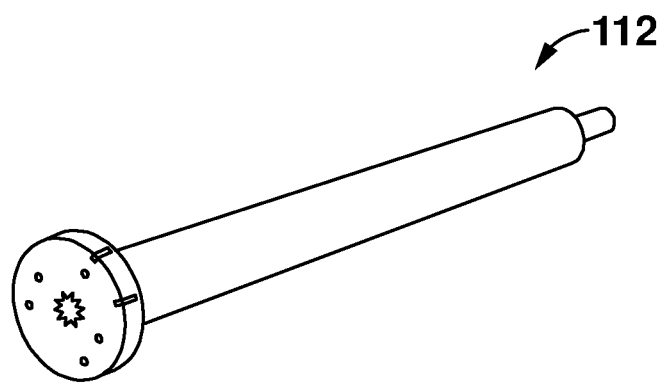
FIG. 6 shows a perspective view of the roller unit of the curtain-type shutter embedded with photovoltaic cells in an embodiment of the present invention.
Figure 7:
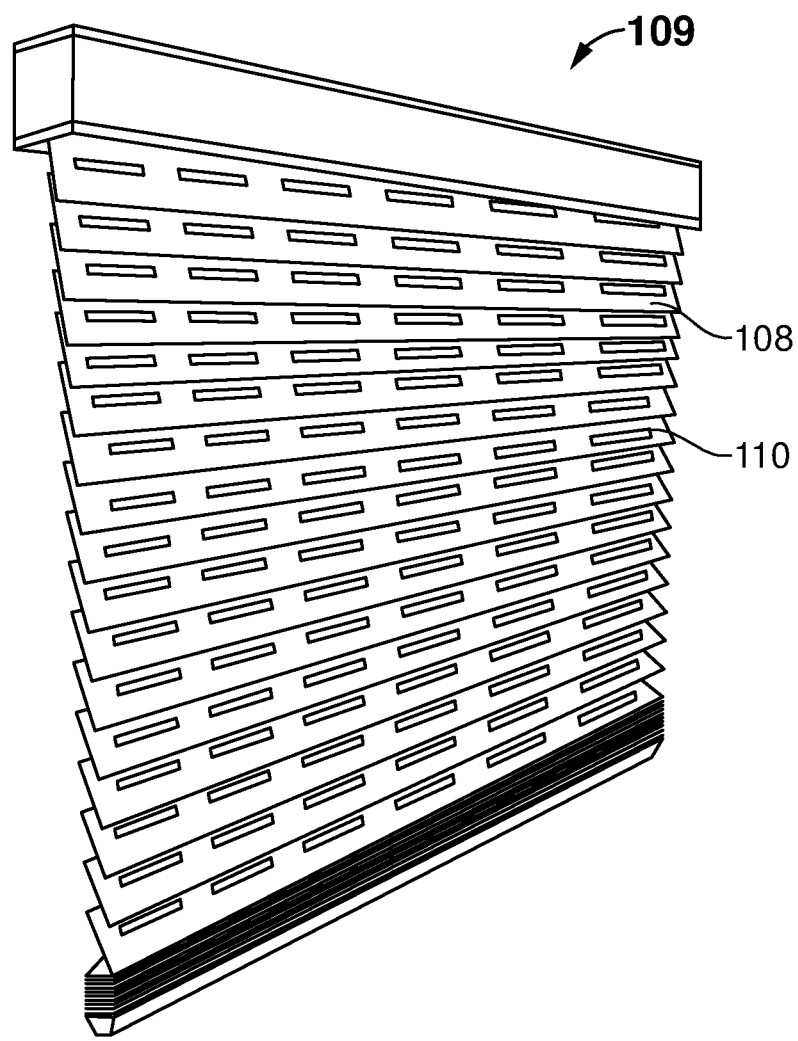
FIG. 7 illustrates a perspective view of a venetian blind embedded with photovoltaic cells in an embodiment of the present invention.

Referring to FIG. 5, the shutter 105 type solar panel assembly could be controlled remotely either to drop down or to wound up the shutter 105 via a remote-control unit, in an embodiment of the present invention. Referring to FIG. 6, a perspective view of the roller unit 112 of the curtain-type shutter 105 embedded with photovoltaic cells 110 is shown, in an embodiment of the present invention. Referring to FIG. 7, a perspective view of a venetian blind 109 embedded with photovoltaic cells 110 is disclosed, in an embodiment of the present invention.

In another embodiment, the unmanned aerial vehicle comprises an enclosure, a protective cover assembly, and a controller. In another embodiment, the solar panel assembly is a sail embedded with a plurality of photovoltaic cells 110, hereinafter referred as PV sail 104. In one embodiment, the solar panel assembly is disposed within the enclosure of the unmanned aerial vehicle. The enclosure comprises an opening. The protective cover assembly is disposed at the opening of the enclosure. In one embodiment, the solar panel assembly is a curtain-type shutter embedded with a plurality of photovoltaic cell 110.

The energy storage unit 128 in communication with the photovoltaic sail 104 is configured to store energy generated from the solar panel. The controller in communication with the solar panel assembly, enclosure, energy storage unit and protective cover assembly configured to monitor the voltage level of the energy storage unit. In one embodiment, if the voltage level of the energy storage unit 128 is equal to or smaller than a predetermined voltage, the controller is configured to transmit information to open the protective cover assembly and disengages the solar panel to collect solar energy to charge the power storage unit 128. In one embodiment, the PV sail 104 driving circuitry is configured to open the protective cover and drive the BLDC motor to a certain direction. The PV sail 104 comprising a complex mechanical structure with its protrusion disengages downwards and controlled by the BLDC's rotor. When the PV sail 104 has been "dropped" successfully it will begin collecting solar energy and charge the internal battery or energy storage unit 128.

In one embodiment, if the voltage level of the energy storage unit is above the predetermined voltage, the controller is configured to retract the disengaged solar panel into the enclosure and closes the opening via the protective cover assembly. In one embodiment, the PV sail 104 is coupled to the rotor of a BLDC type motor. In one embodiment, the unmanned aerial vehicle further comprises a photosensor in communication with the controller configured to detect the direction of solar energy. Further, the controller is configured to hover the unmanned aerial vehicle to towards the direction of solar energy to collect solar energy by the solar panel assembly.

In an embodiment, if the battery of the drone 102 has reached a critically low battery voltage (it has been depleted fully), the controller is configured to initiate an emergency landing procedure. The drone 102 will land smoothly and before going into low-power mode in order to conserve the remaining battery life (LP) and transmit its local coordinates to the nearest drone control station.

Figure 8:
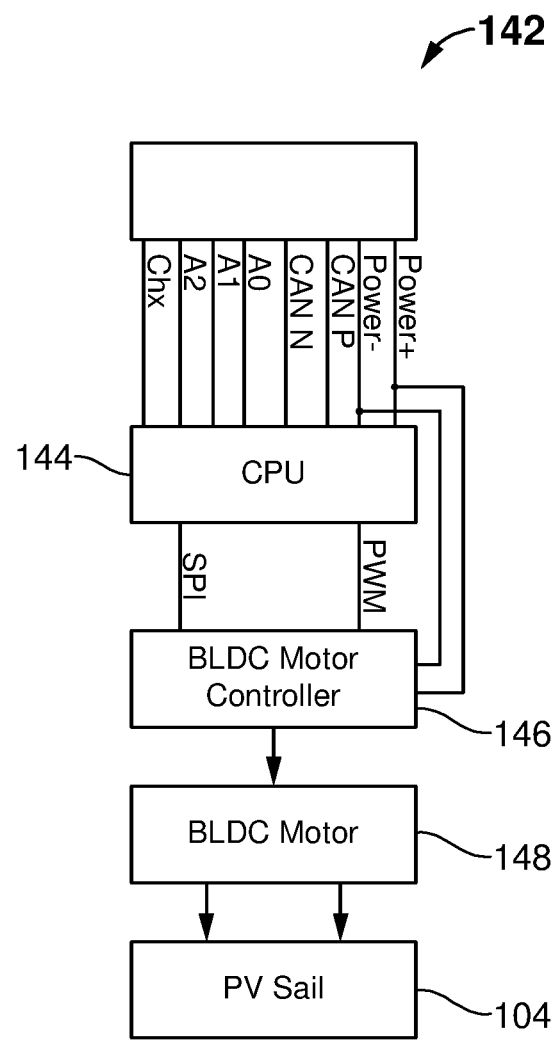
FIG. 8 illustrates a block diagram of the controller of the drone integrated with photovoltaic sail according to an embodiment of the present invention.

Referring to FIG. 8, an electrical diagram of PV sail motor driving board 142 is illustrated. The PV sail motor driving board 142 comprises an 8-pin connector, a CPU 144, a BLDC motor controller 146, a BLDC motor 146 and a PV sail 104. The 8-pin connector configured to receive all routed power and control signals. The CPU 144 is a small low power CPU which will handle locally the driving information which was sent from the Controller board's CPU and provide the BLDC motor controller 146 with a data stream via a PWM or SPI type-based connectivity between the two ICs. The BLDC motor controller 146 IC is configured to drive the BLDC motor 148. The PV sail 104 is configured to charge the connected internal battery.

In one embodiment, the PV sail motor board 142 and controller communicates via a wired interface utilizing CAN bus interface and several additional signals. The PV motor board 142 comprises an 8-pin connector connected with specific controlling signals and power. In one embodiment, the controller also comprises a seven of these connectors, which facilitates the autonomous driving vehicle to have a flexibility to control all moving parts (joints, propellers and PV sail 104) separately and with ease via a simple cable connecting from these connectors to each motor board.

In one embodiment, at least two connectors (i.e., wired pin 1 and 2) is configured to provide power to the motor board module. In one embodiment, at least two connectors (i.e., wired pin 3 and 4) is configured to transfer data from the Master controller CPU to each module. In one embodiment, CAN interface is used as data transfer interface for its reliability and relative simplicity. The CAN interface is used with the master controller CPU for sending/receiving data packets of predefined format and size, including start bit, identification information, core data, checksum and stop bit.

In one embodiment, at least three pins (i.e. wired pin 5, 6, 7) identify a respective motor board controlling respective segment of the drone 102. Using A0, A1 and A2 lines the master CPU or controller is configured to generate a 3-bit address (a total of 8 possible binary addresses) and provide each Motor board with its own unique ID. Upon initial power up and module initialization procedure, the CPU will toggle each ChX output line sequentially and put the unique 3-bit address on the AX lines. On the receiving end upon reading that the ChX input line has been toggled the Motor board will read the sent 3-bit address and "remember" it within its internal registers (memory). After the full initialization process has been successfully completed, every module will know its identification information which is essential to know when it is being addressed by the CPU during the CAN data transfer, by reading the ID part of the data packet, describing to which peripheral device it is intended.

In one embodiment, at least one pin (pin 8) or ChX (Channel X) pin is connected separately to every connector of the Controller board CPU. Upon initial power, the ChX is configured to identify a respective motor board controlling the respective segment of the drone 102 as described above. During normal operation, the ChX is configured is to trigger (poll or interrupt) each Motor board and request additional action from its side. One of the scenarios in which it is used is as following: In such a scenario the ChX is used to interrupt the operation of one of the Motor modules and trigger the proper interrupt software procedure on the Motor module's side. During this procedure the master CPU will request from the Motor board identification data to be sent over the comm channel, describing parameters such as a type of mechanical part attached to it (for instance the PV sail 104), motor type and etc.

By this way by polling (checking) the status information of each propeller Motor modules, the CPU will have information about multiple points which are essential during the operation of the AD such as—if the propellers on both sides are matched (e.g. if there is a difference in propeller sizes or motors, due to a user mistake, which can cause destabilization of the drone during flight), what propellers are used and etc. All of this data is essential for the CPU so that it can accurately provide driving commands to each propeller. If a mismatching has been detected, the CPU has the authority to stop the drone 102 from taking off and take further actions (e.g. send status messages to the LoRa gateway controller module). This control is used to accurately send drive commands and control the PV sail 104.

Figure 9:
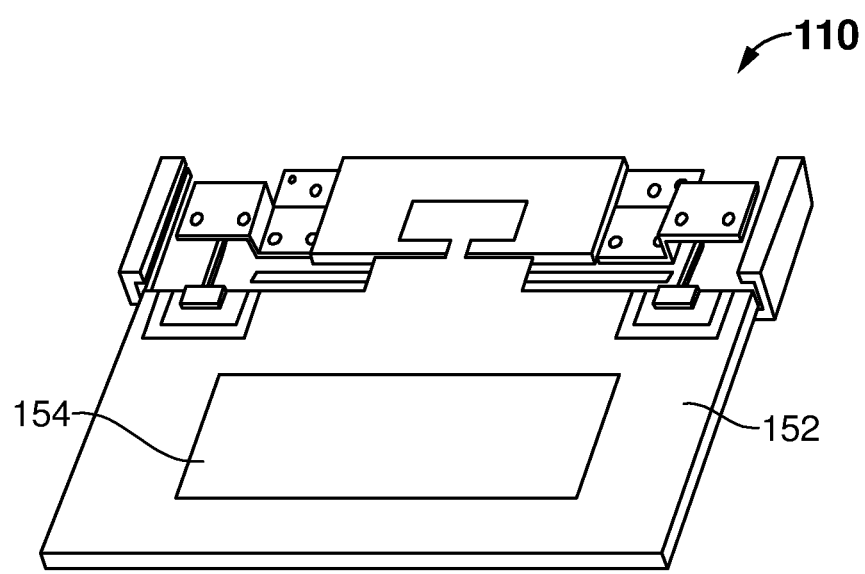
FIG. 9 illustrates a perspective view of a photovoltaic cell in an embodiment of the present invention.
Figure 10:
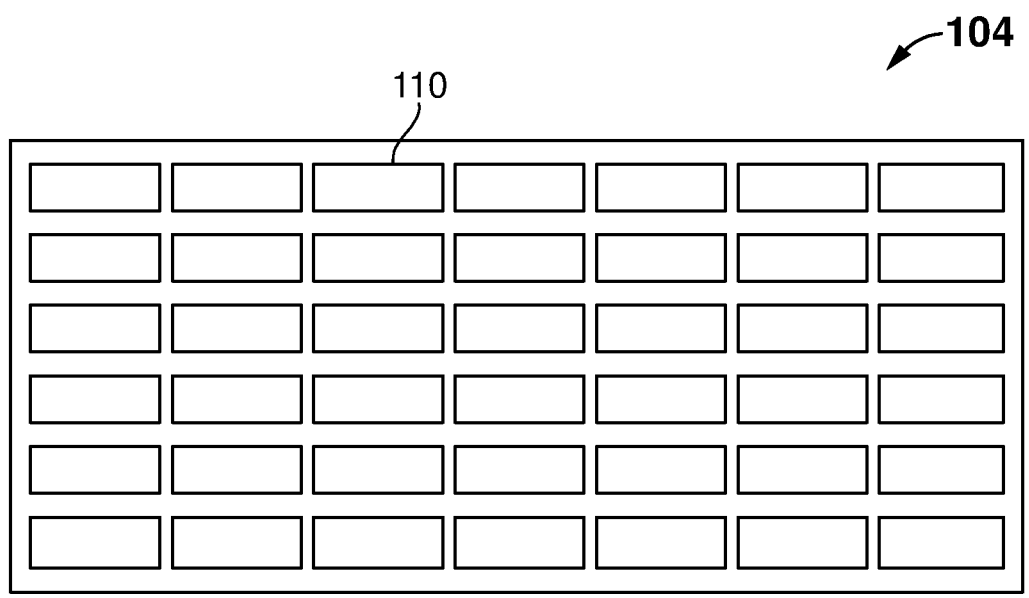
FIG. 10 illustrates the PV sail comprising a plurality of photovoltaic cell in an embodiment of the present invention.
Figure 11:
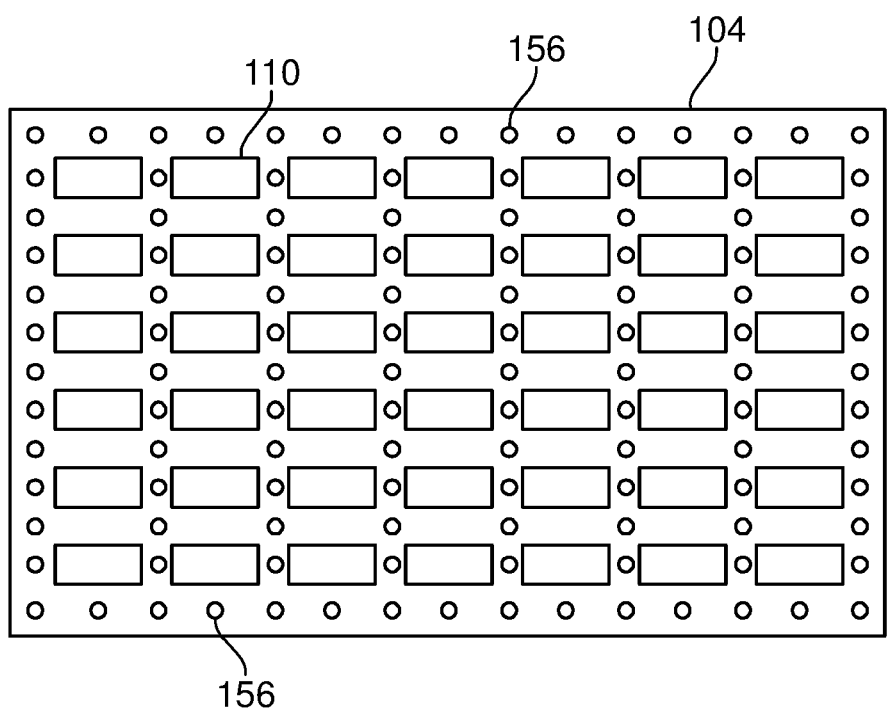
FIG. 11 illustrates the PV sail with holes comprising a plurality of photovoltaic cell in an embodiment of the present invention.
Figure 12:
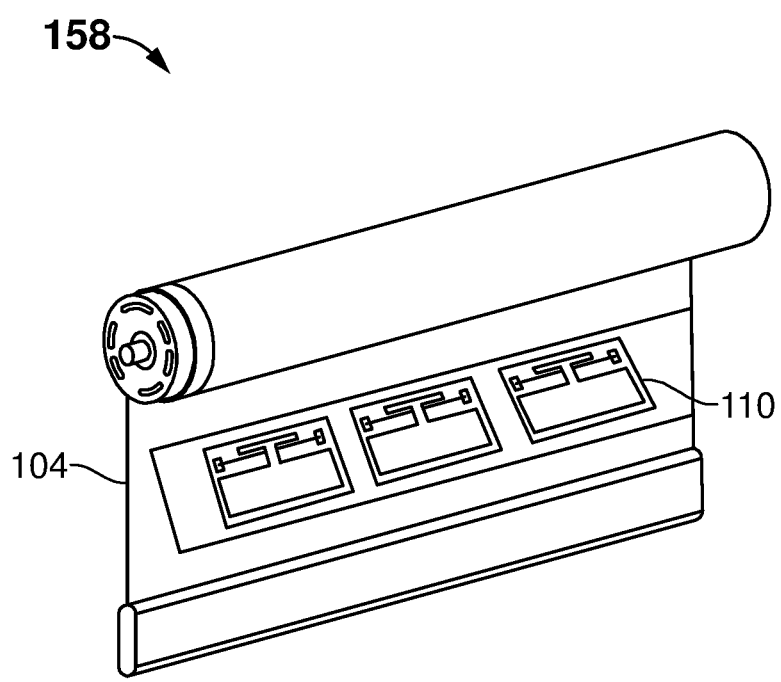
FIG. 12 illustrates the PV sail in a curtain type shutter configuration in another embodiment of the present invention.
Figure 13:
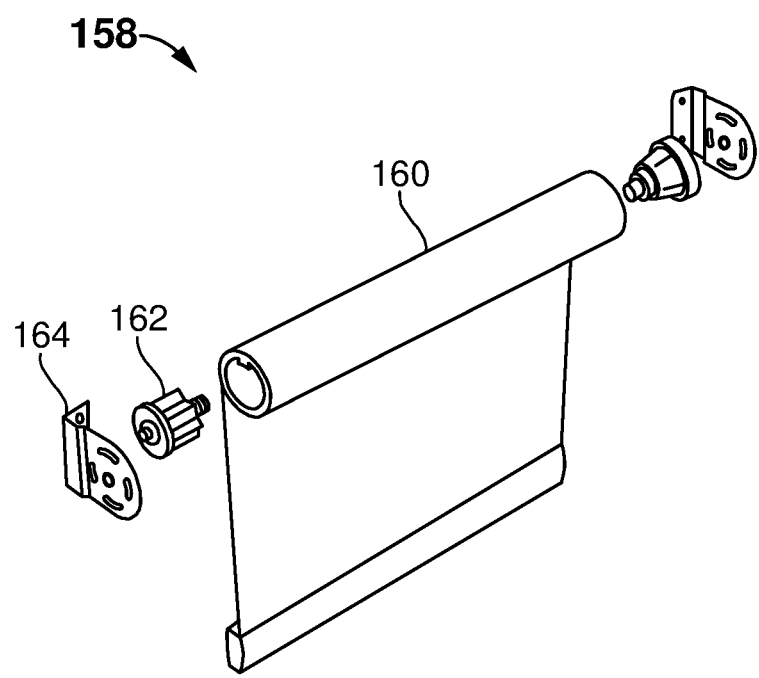
FIG. 13 illustrates a various component of the PV sail in the curtain type shutter configuration in an embodiment of the present invention.
Figure 14:
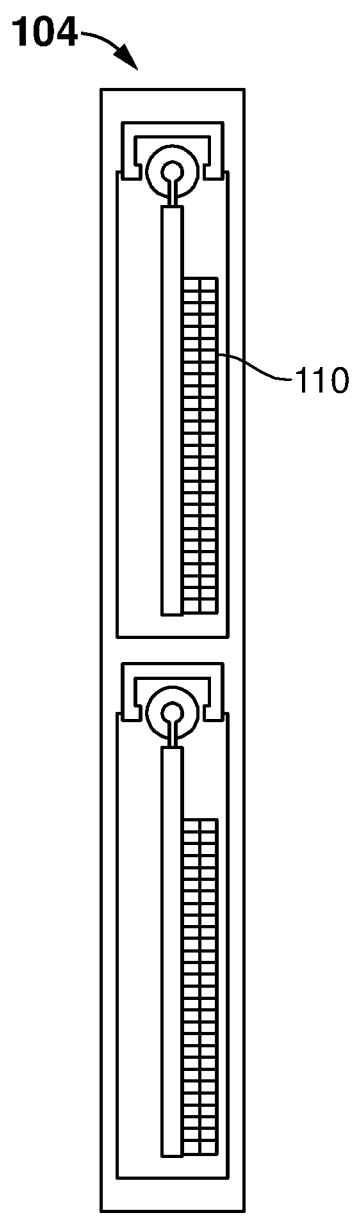
FIG. 14 illustrates a side view of photovoltaic cells of the PV sail in an embodiment of the present invention.

FIG. 9 illustrates a perspective view of a photovoltaic cell 110 in an embodiment of the present invention. The photovoltaic cell 110 comprising photovoltaic 152 and piezoelectric element 154 is illustrated. FIG. 10 illustrates a photovoltaic sail 104 comprising an arrangement of a plurality of photovoltaic cells 110 in an embodiment of the present invention. Referring to FIG. 11, in one embodiment, the photovoltaic sail 104 disposed with plurality of holes 156 to enable wind to pass through the sail or curtain. Referring to FIG. 12, in another embodiment, the photovoltaic sail 104 could be designed in the form of a curtain type shutter 158 comprising plurality of photovoltaic cells 110. Referring to FIG. 13, in another embodiment, the curtain type shutter 158 comprises an aluminum rod 160, plunger end 162 and a plunger end bracket 164. FIG. 14 illustrates side view of photovoltaic cell 110 of the photovoltaic sail 104 in an embodiment of the present invention.

Figure 15:
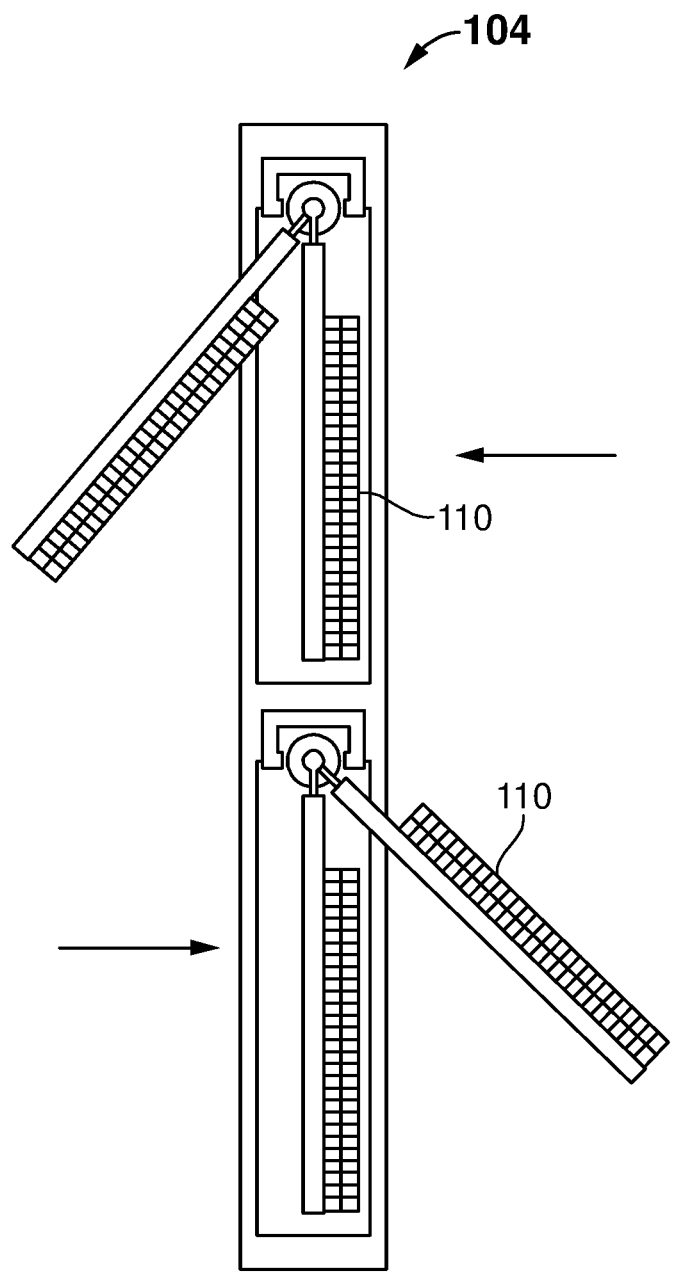
FIG. 15 illustrates the movement of PV sail in wind direction in an embodiment of the invention.

FIG. 15 illustrates the movement of PV sail 104 in wind direction in an embodiment of the invention. In an embodiment, the drone 102 comprises means to rotate PV sail 104 preferably through a total angle of at least about 180 degrees, i.e., ±90 degrees relative to the vertical, as the aircraft maneuvers, for example, in a "loiter" mode around a stationary, oval flight path, thereby maintaining the solar energy gathering PV sail 104 oriented in a position that maximizes the solar energy collected by the vehicle during the daytime. This arrangement thus maximizes the solar energy that can be collected in high latitudes in winter months for a given size of the panel, resulting in a positive trade of more solar energy collected than is used by the additional weight and drag of the panel.

Figure 16:
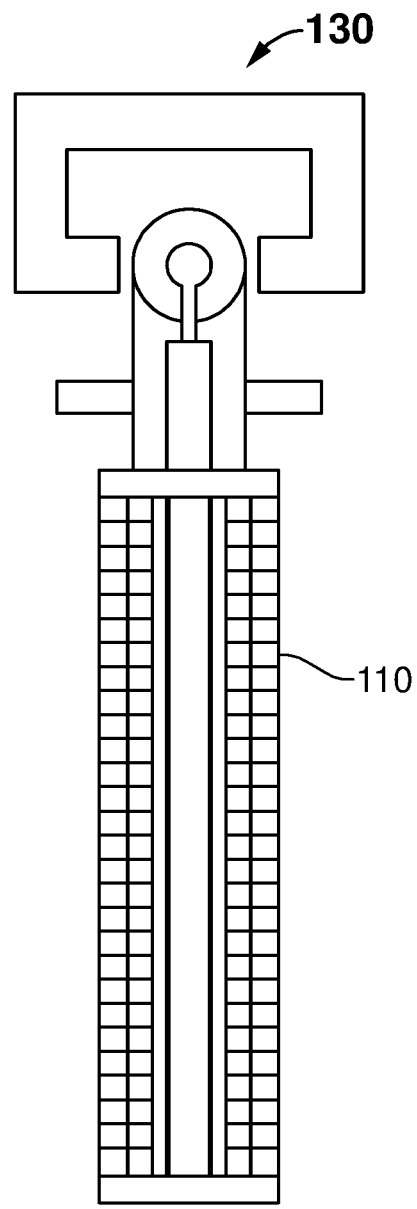
FIG. 16 illustrates a dual-sided solar panel in an embodiment of the present invention.
Figure 17:
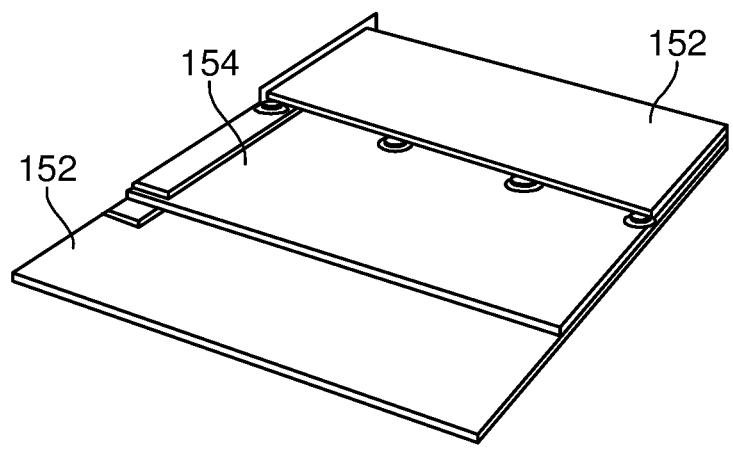
FIG. 17 illustrates various layers of dual-sided solar panel in an embodiment of the present invention.

FIG. 16 illustrates dual-sided solar panel 130 in an embodiment of the present invention. FIG. 17 illustrates layers of dual-sided solar panel 130 in an embodiment of the present invention. In one embodiment, the dual-sided solar panel 130 comprises photovoltaic element 152 at a top and bottom part, and piezoelectric element 154 in the middle part.

Figure 18:
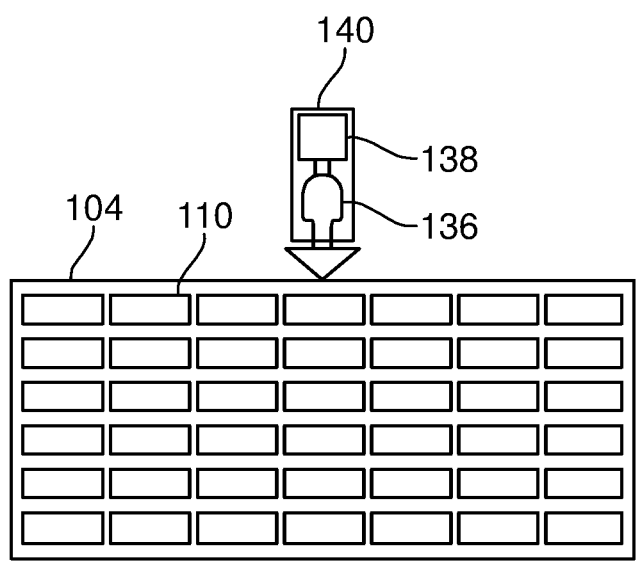
FIG. 18 illustrates power generation from PV sail in an embodiment of the present invention.
Figure 19:
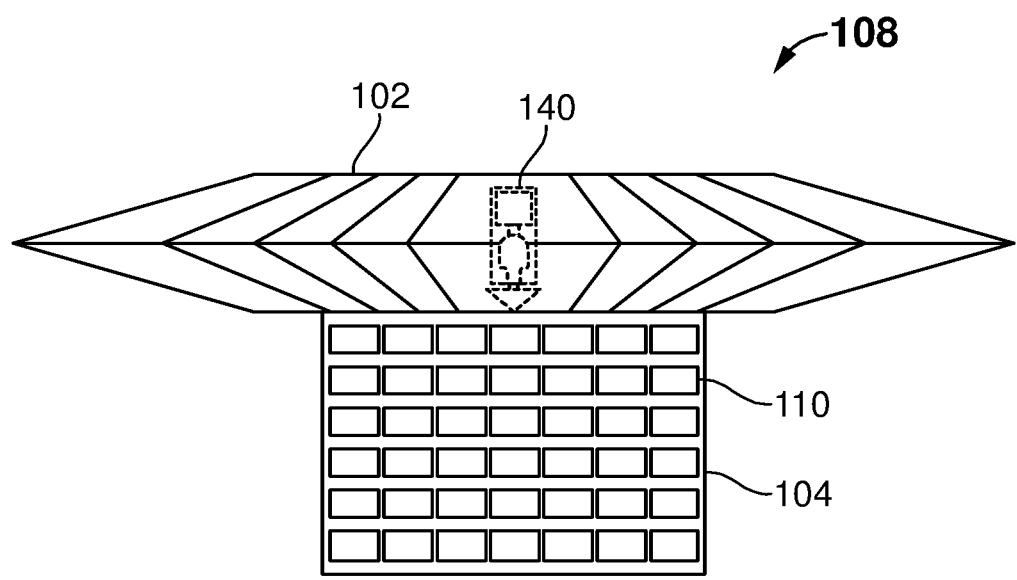
FIG. 19 illustrates power generation utilizing PV sail integrated within the drone in an embodiment of the present invention.

FIG. 18 illustrates power generation from PV sail 104 in an embodiment of the present invention. In one embodiment, the photovoltaic sail 104 is attached to a rotational mechanism which enables the free rotation movement and enables efficient harvesting of rotational energy. The mechanism is coupled to the gearbox 136 which is connected to the generator 138 disposed in the nacelle 140. FIG. 19 illustrates power generation from PV sail 104 having curtain type shutter configuration integrated within the drone 102 in an embodiment of the present invention.

Figure 20:
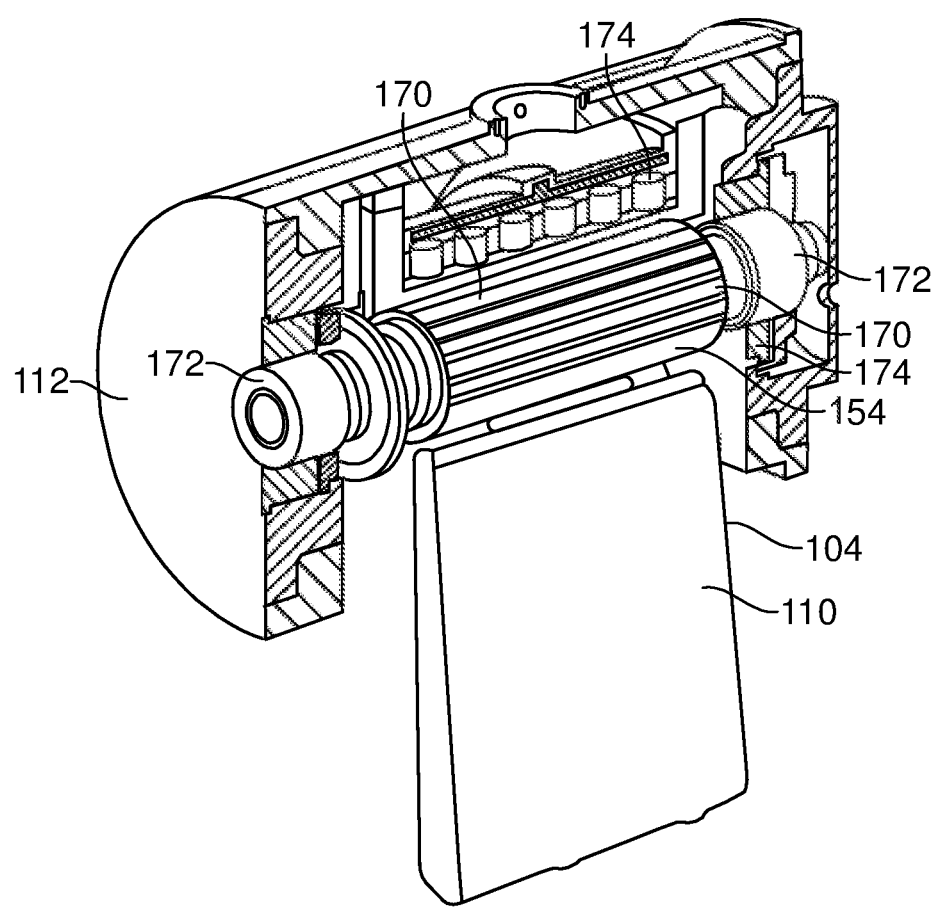
FIG. 20 exemplarily illustrates a cutaway view of the roller unit in an embodiment of the present invention.
Figure 21:
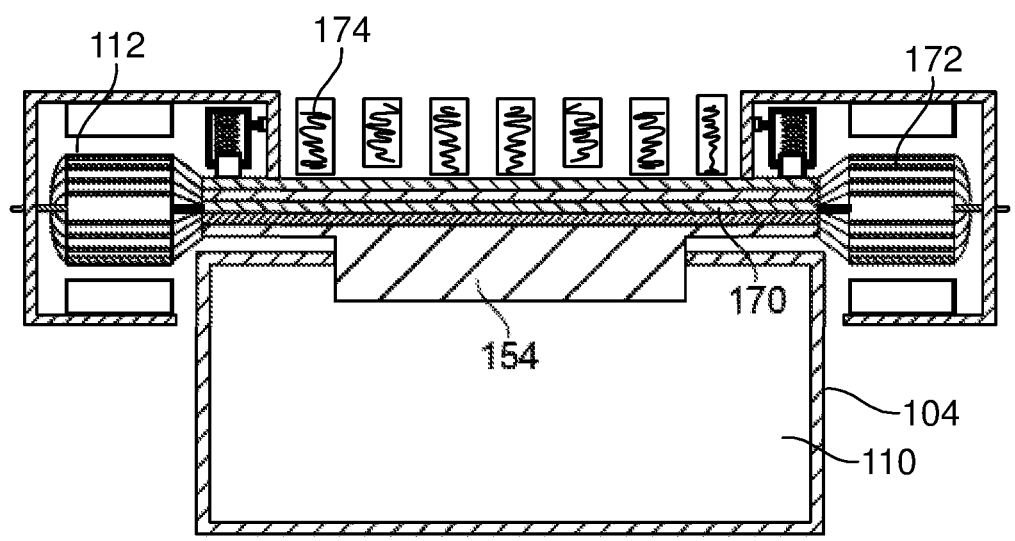
FIG. 21 exemplarily illustrates a cross-sectional view of the roller unit in an embodiment of the present invention.

FIG. 20 exemplarily illustrates a cutaway view of the roller unit 112 in an embodiment of the present invention. FIG. 21 exemplarily illustrates a cross-sectional view of the roller unit 112 in an embodiment of the present invention. Further, a rotational mechanism of the drone 102 is illustrated. In one embodiment, each slat 108 comprises a piezoelectric maneuverability mechanism to harvest energy. In another embodiment, each slat 108 comprises a rotational mechanism utilizing motor, to harvest energy. In yet another embodiment, each slat 108 comprises at least one of a piezoelectric maneuverability mechanism or a rotational mechanism to harvest energy. In yet another embodiment, each slat 108 is configured to move side to side due to the direction of wind to harvest energy. If the wind is strong, the slats 108 of the sail 104 are configured to open and harmlessly enable aerodynamic stability to the drone 102. The rotational mechanism enables to capture energy created through the movement in maneuvering that consequently enables an electromagnetic field to be present. In yet another embodiment, each slat 108 comprises a motor that enables protrusion of slats 108. This functionality subject maximum exposure of slats 108 to sunlight and results in maximum energy harvest.

In one embodiment, the drone 102 comprises a sensor assembly. In one embodiment, the sensor assembly, includes, but not limited, maneuverability sensor and a sensor to trigger downward sail. If the battery of the drone 102 reaches below a predefined capacity, for example below 20%, the sensor triggers downward sail of the drone 102. In another embodiment, based on the direction of sunlight and data of internal clock, the maneuverability sensor orientates the drone 102 in specific direction.

In one embodiment, the roller unit comprises magnets 170, and multiple magnetic slats 172 attached in cyclical fashion. The multiple magnetic slats 172 are configured to rotate cyclically and, pass to and fro, in conjunction with the direction of the wind. Also, in the same capacity cultivates the electromagnetic field which is absorbed by the respective copper coils 174. In another embodiment, photovoltaic cells 110 also attached to a piezoelectric strip 154 which also enables the compression of wind force to be effectively absorb harnessed and garnered. In another embodiment, the sail 104 could be made of any material suitable for encompassing the components of the drone 102 and capable of providing movement/stability.

Advantageously, the unmanned aerial vehicle may continuously perform a task for 24 hours while repeating task performance, vertical take-off and landing, charging, and stand-by as necessary. Further, the battery of the unmanned aerial vehicle is automatically charged, so that a manual operation, such as changing the battery, is not required, thereby decreasing labor costs and automatizing a task of the unmanned aerial vehicle. The drone 102 is directed towards charging the UAV's energy supplies using solar energy as an energy source, thereby negating the need for the UAV to return to the base location for charging purposes.

Although a single embodiment of the invention has been illustrated in the accompanying drawings and described in the above detailed description, it will be understood that the invention is not limited to the embodiment developed herein, but is capable of numerous rearrangements, modifications, substitutions of parts and elements without departing from the spirit and scope of the invention.

The foregoing description comprises illustrative embodiments of the present invention. Having thus described exemplary embodiments of the present invention, it should be noted by those skilled in the art that the within disclosures are exemplary only, and that various other alternatives, adaptations, and modifications could be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions. Although specific terms could be employed herein, they are used only in generic and descriptive sense and not for purposes of limitation. Accordingly, the present invention is not limited to the specific embodiments illustrated herein.

What is claimed is:

1. An unmanned aerial vehicle (UAV) integrated with renewable energy charging system, comprising:
    a solar panel assembly disposed within an enclosure of the unmanned aerial vehicle, wherein the enclosure comprises an opening, wherein the solar panel assembly is a curtain-type shutter embedded with a plurality of photovoltaic cells;
    an energy storage unit in communication with the solar panel assembly is configured to store energy generated from the solar panel;
    a protective cover assembly is disposed at the opening of the enclosure, and
    a controller in communication with the solar panel assembly, enclosure, energy storage unit and protective cover assembly configured to monitor a voltage level of the energy storage unit,
        wherein if the voltage level of the energy storage unit is equal to or smaller than a predetermined voltage, the controller is configured to open the protective cover assembly and drops the solar panel assembly to collect solar energy and charge the power storage unit, and
        wherein if the voltage level of the energy storage unit is above the predetermined voltage, the controller is configured to retract the solar panel assembly into the enclosure and closes the opening via the protective cover assembly.

2. The unmanned aerial vehicle of claim 1, further comprises a manipulating member in communication with the controller and coupled to the solar panel assembly for twisting and turning the shutter.

3. The unmanned aerial vehicle of claim 1, further comprises a photosensor in communication with the controller configured to detect the direction of solar energy.

4. The unmanned aerial vehicle of claim 1, wherein the controller is configured to direct the solar panel assembly towards a direction of the solar energy.

5. The unmanned aerial vehicle of claim 1, wherein the controller is configured to hover the unmanned aerial vehicle towards a direction of solar energy to collect solar energy by the solar panel assembly.

6. The unmanned aerial vehicle of claim 1, wherein if the voltage level of the energy storage unit is critically below the predefined voltage, the controller is configured to initiate an emergency landing procedure and transmits a set of coordinates of the vehicle to a nearest UAV control station.

7. A system for charging an unmanned aerial vehicle (UAV) during mid-flight, comprising:
    an unmanned aerial vehicle comprising an enclosure with an opening;
    a solar panel disposed within the enclosure of the unmanned aerial vehicle, wherein the solar panel is a curtain-type shutter embedded with a plurality of photovoltaic cells;
    an energy storage unit in communication with the solar panel assembly is configured to store energy generated from the solar panel assembly;
    a protective cover assembly is disposed at the opening of the enclosure, and
    a controller in communication with the solar panel assembly, enclosure, energy storage unit and protective cover assembly configured to monitor the voltage level of the energy storage unit,
        wherein if the voltage level of the energy storage unit is equal to or smaller than a predetermined voltage, the controller is configured to open the protective cover assembly and drops the solar panel assembly to collect solar energy to charge the power storage unit, and
        wherein if the voltage level of the energy storage unit is above the predetermined voltage, the controller is configured to retract the solar panel into the enclosure and closes the opening via the protective cover assembly.

8. The system of claim 7, further comprises a manipulating member in communication with the controller and coupled to the solar panel assembly for twisting and turning the shutter.

9. The system of claim 7, further comprises a photosensor in communication with the controller configured to detect a direction of solar energy.

10. The system of claim 7, wherein the controller is configured to direct the solar panel assembly towards a direction of the solar energy.

11. The system of claim 7, wherein the controller is configured to hover the unmanned aerial vehicle towards a direction of solar energy to collect solar energy by the solar panel assembly.

12. The system of claim 7, wherein if the voltage level of the energy storage unit is critically below the predefined voltage, the controller is configured to initiate an emergency landing procedure and transmits a set of coordinates of the UAV to a nearest UAV control station.

* * * * *